United States Patent Office 3,816,490
Patented June 11, 1974

3,816,490
PRODUCTION OF CARBOXYLIC ACIDS
Denis Forster, University City, and Donald E. Morris, Kirkwood, Mo., assignors to Monsanto Company, St. Louis, Mo.
No Drawing. Filed Dec. 27, 1971, Ser. No. 212,680
Int. Cl. C08h 17/36
U.S. Cl. 260—413         13 Claims

ABSTRACT OF THE DISCLOSURE

Production of carboxylic acids and carboxylic acid anhydrides by carboxylation of ethylenically-unsaturated compounds utilizing a catalyst system comprising a Group VIII metal compound and a promoter selected from the group consisting of phenol, substituted phenols, thiophenol, substituted thiophenols, fluorine-substituted carboxylic acids, thiocarboxylic acids and sulphonic acids.

This invention relates to an improved process for the preparation of carboxylic acids and anhydrides. More particularly it relates to improved catalyst systems for the reaction of ethylenically unsaturated compounds with carbon monoxide in the presence of water or carboxylic acid to yield carboxylic acids and carboxylic acid anhydrides, respectively. More specifically, the said improved catalyst systems are essentially comprised of Group VIII metal compounds and complexes and a promoter component selected from the group consisting of phenol, substituted phenols, thiophenol, substituted thiophenols, fluorine-substituted carboxylic acids, thiocarboxylic acids, and sulfonic acids.

Processes for the preparation of carboxylic acids and anhydrides from olefins, and other ethylenically unsaturated compounds, carbon monoxide and water are well known in the art and have been directed to the production of carboxylic acids and derivatives. The prior art teaches the use of a number of catalysts for the synthesis of carboxylic acids by reaction of olefins with carbon monoxide and water at elevated temperatures and pressures. Catalysts such as boric, arsenic and monochloroacetic acids; acetyl chloride on active carbon; boron trifluoride; barium and calcium halides; salts and carbonyls of nickel and cobalt, especially halides; and, in general, the Group VIII metals, and their simple salts, carbonyls and complexes, have been reported to function for the production of carboxylic acids, anhydrides, and esters from reaction of olefins and carbon monoxide in the presence of water or other hydroxylic compounds at temperatures from 130° C.–175° C. and pressures up to 1,000 atmospheres.

A disadvantage present in the carboxylation processes described in the prior art is low catalyst reactivity in the absence of a halide promoter. In particular, catalysts consisting of Group VIII metal salts, complexes or carbonyls are found to display low reactivity in the presence of halide promoters. Thus, many prior art catalyst systems contain a Group VIII metal and a halide promoter, i.e., Cl−, Br−, and I− as salts, free halogen and hydrohalic acids. The presence of the same halides in these prior art catalyst systems, however, has been found in some circumstances to lead to the formation of the volatile and highly corrosive hydrogen halides and alkyl halides derived from the olefin and water reactants in the course of the reaction. These halide promoted systems therefore require expensive corrosion-resistant alloys in the construction of the reaction vessels and distillation equipment. A further disadvantage of these prior art halide-promoted catalyst systems is that upon distillation of the reaction product the volatile hydrogen halides, halogens and alkyl halides derived from the reactants also distill away from the metal catalyst systems. Consequently, recovery systems have to be devised to allow the recycling of these expensive halide promoters to the reaction vessel. These problems seriously detract from the usefulness of the catalyst systems in processes described in the prior art.

Quite unexpectedly, it has been found that certain phenols, thiophenols, and fluorine-substituted carboxylic acids, and derivatives thereof, thiocarboxylic acids and sulfonic acids function as promoters for carbonylation and carboxylation reactions catalyzed by Group VIII metal compounds. The use of Group VIII metal compounds together with these novel promoters leads to catalyst systems which are not only highly active and stable, but also show no tendency to form corrosive or volatile derivatives in the reaction. These promoters have been found not to react with carbon monoxide in the present catalyst systems based upon Group VIII compounds without added free halides.

In accordance with the present invention, ethylenically unsaturated compounds are converted selectively to carboxylic acids by reaction in the liquid phase with carbon monoxide and water; or to carboxylic acid anhydrides by reaction with carbon monoxide and a carboxylic acid; at temperatures from about 50° to 300° C., preferably 125° C. to 225° C. and at partial pressures of carbon monoxide from 1 p.s.i.a. to 15,000 p.s.i.a., preferably 5 p.s.i.a. to 3000 p.s.i.a. in the presence of an improved catalyst system comprised of a Group VIII metal compound, preferably a cobalt, rhodium or iridium compound and a promoter component selected from the group consisting of a phenol, thiophenol, substituted phenol, substituted thiophenol, fluorine-substituted carboxylic acid, thiocarboxylic acid and sulfonic acids.

As referred to above, for the purpose of the present invention, the improved catalyst system as charged to the reactor contains essentially a Group VIII metal component and a compound from the following group: phenol, thiophenol, substituted phenol, substituted thiophenol, fluorine-substituted carboxylic acid, a thiocarboxylic acid or sulfonic acid, as a promoter. The catalyst system essentially includes a Group VIII metal compound or complex as the active component. This active catalytic portion or first component of the catalyst system is prepared from a Group VIII metal species such as the metals, simple salts, organometallic compounds and coordination compounds of the metals. Examples of suitable metal compounds are shown in the following partial list of suitable compounds.

$Fe_2O_3$
Co metal
$Ni(NO_3)_2$
$Ru(SO_4)_2$
$Rh(ClO_4)_3 \cdot 6H_2O$
$Pd(CH_3COO)_2$
$Os(C_5H_5)_2$
$Ir_4(CO)_{12}$
$PtCl_2$
$FeBr_3$
$CoI_2$
$Ni[(C_6H_5)_3P]_2(CO)_2$
$Ru[(C_6H_5)_3P]_3Cl_2$
$Rh(C_3H_5)_3$
$Pd[(C_4H_9)_3P](CN)_2$
$Os(CO)_4Cl_2$
$Ir[(C_6H_5)_3As]_2(CO)(CH_3CO_2)$
$Pt[(C_2H_5)_3Sb]Br_2$
$[(C_6H_5)_4As][Rh(CO)_2(CH_3CO_2)_2]$
$[(C_4H_9)_4N][Ir(CO)_2(C_6H_5CO_2)_2]$ Of the Group VIII elements whose compounds are useful in the practice of the present invention, cobalt, rhodium, and iridium are preferred, and of these three, rhodium and iridium are especially preferred.

The promoter portion of the catalyst system essentially consists of a member of the group consisting of phenol, thiophenol, substituted phenols, substituted thiophenols, fluorine-substituted carboxylic acids, thiocarboxylic acids or sulfonic acids. Examples of suitable promoters are illustrated by the following:

(a) phenol, thiophenol, substituted phenols, and substituted thiophenols in which the substituents on the substituted compounds are alkyl substituents of from 1 to 30 carbon atoms; alkoxy substituents of from 1 to 20 carbon atoms, nitro substituents, nitrile substituents; and halogen substituents selected from the group consisting of fluorine, chlorine, bromine, and iodine; such as phenol, thiophenol, cresol, perchlorophenol, pentacyanophenol, pentamethylthiophenol, thiocyclohexane, and perfluorothiophenol;

(b) fluorine substituted carboxylic acids of 1 to 30 carbon atoms; such as monofluorbutyric acid;

(c) thiocarboxylic acids of 1 to 30 carbon atoms and fluorine substituted thiocarboxylic acids of 1 to 30 carbon atoms; such as thioacetic acid and difluorothioacetic acid;

(d) sulfonic acids of 1 to 30 carbon atoms and fluorine substituted sulfonic acids of 1 to 30 carbon atom; such as perfluoromethanesulfonic acid and p-toluenesulfonic acid.

It has been found that when halo-substituted phenols or thiophenols or fluorine-substituted aliphatic carboxylic acids are used as promoters, the aromatic carbon-halogen bonds and the aliphatic carbon-fluorine bonds are stable towards solvolysis to at least 225° C. and thus no corrosive hydrogen halides, halogens or alkyl halides are formed in the reaction. However, it has been found that when chloro-substituted aliphatic carboxylic acids, bromo-substituted aliphatic carboxylic acids or iodo-substituted aliphatic carboxylic acids are used as promoters, the activity is lost, and corrosion becomes severe as these halides on the carboxylic acid are solvolyzed and free hydrogen halide is formed during the course of the reaction.

Although any ratio of promoter portion may be employed, ratios of promoter portion to metal portion expressed as molecules of promoter to atoms of metal in the range 1:1 to 10,000:1 are generally employed. However, the preferred range is 3:1 to 1000:1 promoter molecules to each metal atom.

The liquid reaction medium employed with the said improved catalyst system may be any solvent compatible with the improved catalyst system and may include pure olefins or saturated or unsaturated hydrocarbons. Mixtures thereof with the desired carboxylic acid and/or other carboxylic acids may be employed. If the desired product of the reaction between the ethylenically unsaturated hydrocarbon and carbon monoxide is a carboxylic acid, then water is added to the reaction medium in an amount that is at least stoichiometric with the olefinic reactant, either at the initiation of the reaction or in lesser amounts as the reaction proceeds. If the desired reaction product is a carboxylic acid anhydride, then a carboxylic acid is preferably added to the reaction medium, or alternatively a less than stoichiometric portion of water may be added to the reaction medium. Mixtures of carboxylic acid and anhydride can be obtained by controlling the amount of water and carboxylic acid present, as discussed above.

The present invention is based upon the production of carboxylic acids and carboxylic acid anhydrides by the transformation of an ethylenically unsaturated compound, having from 2 to 30 carbon atoms, and containing the structural unit $$(R_a)(R_b)C=C(R_c)(R_d)$$

in heterocyclic, heteroaliphatic, aliphatic acyclic, cyclic or polycyclic hydrocarbon form, where $R_a$, $R_b$, $R_c$ and $R_d$ are moieties having from 0 to 20 carbon atoms and being selected from the group consisting of hydrogen, halogen, alkyl, alkene, aryl, cycloalkyl, and cycloalkene moieties. The said heterocompounds may also be substituted with nitrogen, phosphorus, sulfur, halogen, or oxygen atoms.

Examples of suitable ethylenically unsaturated compounds which can be used as feedstocks in this invention include ethylene, propylene, butene-1, butene-2, hexenes, octenes, dodecenes, hexadecene, 2-methylpropene, 1,3-butadiene, 2-methyl-1,3-butadiene, 2,3-dimethyl-1,3-butadiene, cyclohexene, methylcyclohexene, styrene, methylstyrene, vinylcyclohexene, 3,3-dimethyl-1-butene, 1,4-hexadiene, 2,4-hexadiene, 1,5-hexadiene, 2-methyl-1,4-hexadiene, acrolein, methyl vinyl ketone, allyl alcohol, 2-phenylbutene, cyclopentadiene, 2-cyclohexylbutene, allene, allylamine, diallylamine, acrylonitrile, methyl acrylate, vinyl chloride, phosphopyruvic acid, and mixtures thereof.

Other suitable feedstocks include compounds having cyclic and polycyclic structures containing, in part, an ethylenically unsaturated linkage which may be converted to a carboxylic acid by the process of this invention. Examples of suitable cyclic structures include 1,5-cyclooctadiene, 1,5,9-cyclododecatriene; furan; 1,2-dithiol and pyrrole. Preferred ethylenically unsaturated feedstocks include ethylene to produce propionic acid; olefins having from 3 to 8 carbon atoms to produce carboxylic acids having from 4 to 9 carbon atoms; and olefins having from 9 to 19 carbon atoms to produce carboxylic acids having from 10 to 20 carbon atoms.

The reaction rate is dependent upon catalyst concentration and temperature. Concentrations of the metal compound or the first component of the catalyst system in the liquid phase, between $10^{-6}$ moles/liter and $10^{-1}$ moles/liter, are normally employed, with the preferred range being $10^{-4}$ moles/liter to $10^{-2}$ moles/liter. Higher concentrations even to the extent of 1 mole/liter may, however, be used if desired. Higher temperatures also favor higher reaction rates.

The concentration of the second component or promoter portion of the catalyst system may vary widely over the broad concentration range of $10^{-6}$ moles/liter to 18 moles/liter, based on promoter molecule. In the process of this invention, however, the preferred concentration range of promoter is $10^{-4}$ moles/liter to 2 moles/liter of catalyst solution.

The active, improved catalystic system is preferably supplied as a catalyst solution. The solution can also include liquid reactants, products and mixtures thereof which function as solvents or reaction media.

The promoting portion or second component of the improved catalyst system as discussed herein consists of a phenol, thiophenol, substituted phenol, substituted thiophenol or fluorine-containing carboxylic acid, thiocarboxylic acid or sulfonic acid and may be supplied to the reaction medium either directly as one of the compounds described above or as an ester derived from one of the compounds.

The preparation of the improved, active catalyst system which includes (a) a Group VIII metal or compounds thereof, and (b) a phenol, thiophenol, substituted phenol, substituted thiophenol, fluorine-containing carboxylic acid or thiocarboxylic acid or a sulfonic acid as promoter may be accomplished by a variety of methods. For example, to prepare the catalyst system, the first component of the catalyst system, e.g., a finely divided Group VIII metal (powder) or a simple compound or complex thereof, as a precursor is dissolved in a suitable medium, and carbon monoxide is bubbled through the above metal containing solution, preferably while maintaining gentle heating and stirring of the solution. Then a solution of the desired promoter source is added to form an active catalyst solution. This catalyst solution containing the necessary metal or its compound, and the promoter is then ready for use as discussed above, and may be employed as a liquid phase or vapor phase catalyst.

As another embodiment of the invention, carboxylic acids or anhydrides may be produced if desired via reaction of ethylenically unsaturated compounds with carbon monoxide and water in the vapor phase over the improved Group VIII metal containing catalyst systems described above, dispersed upon inert supports. Such a catalyst system may be operated in a conventional fixed bed catalytic reactor.

When the reaction of ethylenically unsaturated compounds with carbon monoxide in the presence of water or carboxylic acid is conducted with the improved catalyst systems described in the present invention the disadvantages found with the use of the catalyst systems in the prior art are overcome. In particular, the use of Group VIII metal compounds as catalysts in the absence of any promoter gives systems which exhibit only very poor reactivity. Hence, in order to attain reasonable reaction rates from such systems, excessively high reaction temperatures and excessively high carbon monoxide pressures are required. The use of chlorine, bromine or iodine halides as promoters for these Group VIII metal catalysts, as described in the prior art, frequently allows more feasible reaction temperatures and pressure to be used but the presence of free halide in such systems leads to excessive corrosion of the reaction and distillation equipment which can only be controlled by use of expensive alloys in the construction of the equipment. Further, these volatile halide promoters are frequently removed during the distillation procedure following the reaction and schemes for the recovery of these expensive halides must be devised. The catalyst systems of the present invention overcome all of these aforesaid disadvantages since excellent rates can be attained at reasonable reaction temperatures and pressures without corrosion of standard reaction and distillation equipment and further, the low volatility of the promoter portion of the catalyst system results in there being no loss of promoter during the distillation of the product.

For a better understanding of the process of the present invention, specific embodiments of the invention are presented below. These examples and illustrations are not to be construed in any way as limiting the scope of the invention.

EXAMPLE 1

A batch reactor is charged with the following ingredients: 0.312 g. (0.4 mmole) of $IrCl(CO)(Ph_3P)_2$ as the catalyst precursor; 1.00 g. (0.5 mmoles) of perfluorothiophenol, $C_6F_5SH$, as the promoter component; 4 ml. of $H_2O$ as a reactant; and 76 ml. of propionic acid as the solvent.

The reactor is pressured to 50 p.s.i.g. with carbon monoxide and then heated to 190° C. After reaching the desired reaction temperature, 195° C., the reactor is then pressured to 700 p.s.i.g. with 50/50 mole percent.

$CO/C_2H_4$ gas blend. The reaction is carried out at constant pressure by feeding the gas blend from a high pressure reservoir into the reactor. During the reaction time of ca. 8 hrs., 1470 p.s.i.g. of feed gas is consumed.

The reaction mixture upon analysis by gas chromatography, yields a solution containing:

|  | Wt. percent |
|---|---|
| Propionic anhydride | 22.6 |
| Propionic acid | 74.8 |

An examination of the Type 316 stainless steel reactor vessel and it internal parts after reaction reveals little if any corrosion. When the same reaction is performed using HI or $ClCH_2COOH$ as the promoter, an examination of the Type 316 stainless steel equipment after 8 hrs. of reaction time at 195° C. reveals severe corrosion effects.

The reaction solution is examined upon completion of the reaction and found to contain no solids. This facilitates the product separation and recycle procedures as it eliminates the need for pumping solids. The reaction system also contains the thiophenol promoter which does not undergo reaction.

EXAMPLE 2

0.312 g. (0.4 mmole) of $IrCl(CO)(Ph_3P)_2$ as the catalyst precursor;
1.056 g. (4.0 mmoles) of pentochlorophenol, $C_6Cl_5OH$, as the promoter component;
4 ml. of $H_2O$ as a reactant; and 76 ml. of acetic acid as the solvent.

The reactor is pressured to 230 p.s.i.g. with carbon monoxide and then heated to 195° C. After reaching the desired reaction temperature, 195° C., the reactor is then pressured to 700 p.s.i.g. with a 50/50 mole percent $CO/C_2H_4$ gas blend. The reaction is carried out at constant pressure by feeding the gas blend from a high pressure reservoir into the reactor to maintain the reactor pressure constant. During the reaction time of 75 minutes 1030 p.s.i.g. of feed gas is consumed.

The reaction mixture, upon analysis by a gas chromatography technique, yields a solution containing:

|  | Wt. percent |
|---|---|
| Water | 0.9 |
| Acetic acid | 80.8 |
| Propionic acid | 18.3 |

EXAMPLE 3

The present example is included to demonstrate that the promoter component in Examples 1 and 2, i.e, $C_6F_5SH$ and $C_6Cl_5OH$ respectively, are not the source of free hydrohalic acid which itself can act as a promoter.

A batch reactor is charged with the following ingredients: 0.312 g. (0.4 mmole) of $IrCl(CO)(Ph_3P)_2$ as the catalyst precursor; 0.55 g. (5.0 mmoles) of thiophenol, $C_6H_5SH$, as the promoter component; 4 ml. of $H_2O$ as a reactant; and 76 ml. of propionic acid as the solvent.

The reactor is pressured to 50 p.s.i.g. with carbon monoxide and then heated to 195° C. After reaching the desired reaction temperature, 195° C., the reactor is then pressured to 700 p.s.i.g. with a 50/50 mole percent $CO/C_2H_4$ blend. The reaction is carried out at constant pressure by feeding the gas blend from a high pressure reservoir into the reactor to maintain the reactor pressure constant. During the reaction time of ca. 20 hrs., 1980 p.s.i.g. of feed gas is consumed.

The reaction mixture, upon analysis by a gas chromatography technique, yields a solution containing:

|  | Wt. percent |
|---|---|
| Propionic anhydride | 31.1 |
| Propionic acid | 67.4 |

This example definitely shows that free hydrohalic acid is not being generated by carbon-halogen bond cleavage and consequently acting as the real promoter component.

EXAMPLE 4

The following example is included to demonstrate that the catalyst precursor in Examples 1, 2 and 3, i.e., $IrCl(CO)(Ph_3P)_2$, is not a source of free hydrohalic acid, which itself can act as a promoter.

A batch reactor is charged with the following ingredients: 0.309 g. (0.4 mmole) of $HIr(CO)_2(Ph_3P)_2$ as the catalyst precursor; 1.00 g. (5.0 mmoles) of pentafluorothiophenol, $C_6F_5SH$, as the promoter component; 4 ml. of $H_2O$ as a reactant; and 76 ml. of acetic acid as the solvent. The reactor is pressured to 50 p.s.i.g. with carbon monoxide and then heated to 195° C. After reaching the desired reaction temperature, 195° C., the reactor is then pressured to 700 p.s.i.g. with a 50/50 mole percent CO/C$_2$H$_4$ blend. The reaction is carried out at constant pressure by feeding the gas blend from a high pressure reservoir into the reactor to maintain the reactor pressure constant. During the reaction time of 3.5 hours, 660 p.s.i.g. of feed gas is consumed.

The reaction mixture, upon analysis by a gas chromatography technique, yields a solution containing

| | Wt. percent |
|---|---|
| Water | 2.4 |
| Acetic acid | 87.0 |
| Propionic acid | 10.6 |

This example definitely shows that free hydrohalic acid is not being generated by metal-halide bond cleavage and consequently acting as the real promoter component.

EXAMPLE 5

The following example is an example of a non-promoted run and is included for a rate comparison with the promoted runs.

A batch reactor is charged with the following ingredients: 0.312 g. (0.4 mmole) of IrCl(CO)(Ph$_3$P)$_2$ as the catalyst precursor; 4 ml. of H$_2$O as a reactant; and 76 ml. of propionic acid as the solvent.

The reactor is pressured to 50 p.s.i.g. with carbon monoxide and then heated to 195° C. After reaching the desired reaction temperature, 195° C., the reactor is then pressured to 700 p.s.i.g. with a 50/50 mole percent CO/C$_2$H$_4$ blend. The reaction is carried out at constant pressure by feeding the gas blend from a high pressure reservoir into the reactor to maintain the reactor pressure constant. During the reaction time of 8 hours, 960 p.s.i.g. of feed gas is consumed.

The reaction mixture, upon analysis by a gas chromatography technique, yields a solution containing

| | Wt. percent |
|---|---|
| Water | 0.2 |
| Propionic acid | 98.8 |

The volume of the solution increases from 80 ml. to 91 ml. This increase in volume together with the gas chromatography results indicates the synthesis of 15 g. of propionic acid.

The maximum rate of propionic acid production of this non-promoted experiment is 0.32 moles/1-hr. This rate may be compared to the following promoted systems: pentafluorothiophenol, C$_6$F$_5$SH (Example 1); pentachlorophenol, C$_6$Cl$_5$OH (Example 2); or thiophenol, C$_6$H$_5$SH (Example 3), which yield maximum rates of 2.25 moles/1-hr., 2.56 moles/1-hr., and 1.44 moles/1-hr., respectively. Thus, these promoters definitely increase the activity of the catalyst.

EXAMPLE 6

A batch reactor is charged with the following ingredients: 0.276 g. (0.4 mmole) of RhCl(CO)(Ph$_3$P)$_2$ as the catalyst precursor; 1.00 g. (5.0 mmoles) of pentafluorothiophenol, C$_6$F$_5$SH, as the promoter component; 4 ml. of H$_2$O as a reactant; and 76 ml. of acetic acid as the solvent.

The reactor is pressured to 50 p.s.i.g. with carbon monoxide and then heated to 195° C. After reaching the desired reaction temperature, 195° C., the reactor is then pressured to 700 p.s.i.g. with a 50/50 mole percent CO/C$_2$H$_4$ blend. The reaction is carried out at constant pressure by feeding the gas blend from a high pressure reservoir into the reactor to maintain the reactor pressure constant. During the reaction time of 20 hours, 1045 p.s.i.g. of feed gas is consumed.

The reaction mixture, upon analysis by a gas chromatography technique, yields a solution containing

| | Wt. percent |
|---|---|
| Water | 0.3 |
| Acetic acid | 82.6 |
| Propionic acid | 17.1 |

EXAMPLE 7

A batch reactor is charged with the following ingredients: 0.149 g. (0.4 mmole Co) of Co$_2$(CO)$_6$(Bu$_3$P)$_2$ as the catalyst precursor; 1.00 g. (5.0 mmoles) of pentafluorothiophenol, C$_6$F$_5$SH, as the promoter component; and 80 ml. of propionic acid as the solvent.

The reactor is pressured to 50 p.s.i.g. with carbon monoxide and then heated to 150° C. After reaching the desired reaction temperature, 150° C., the reactor is then pressured to 700 p.s.i.g. with a 50/50 mole percent CO/C$_2$H$_4$ blend. The reaction is carried out at constant pressure by feeding the gas blend from a high pressure reservoir into the reactor to maintain the reactor pressure. During the reaction time of 21 hours, 500 p.s.i.g. of feed gas is consumed.

The reaction mixture, upon analysis by a gas chromatography technique, yields a solution containing

| | Wt. percent |
|---|---|
| Propionic anhydride | 14.3 |
| Propionic acid | 83.8 |

EXAMPLE 8

A batch reactor is charged with the following ingredients: 0.280 g. (0.4 mmole) of PdCl$_2$(Ph$_3$P)$_2$ as the catalyst precursor; 1.00 g. (5.0 mmoles) of pentafluorothiophenol, C$_6$F$_5$SH as the promoter component; and 80 ml. of propionic acid as the solvent.

The reactor is pressured to 50 p.s.i.g. with ethylene and then heated to 130° C. After reaching the desired reaction temperature, 130° C., the reactor is then pressured to 700 p.s.i.g. with a 50/50 mole percent CO/C$_2$H$_4$ blend. The reaction is carried out at constant pressure by feeding the gas blend from a high pressure reservoir into the reactor to maintain the reactor pressure. During the reaction time of 20 hours, 390 p.s.i.g. of feed gas is consumed.

The reaction mixture, upon analysis by a gas chromatography technique, yields a solution containing

| | Wt. percent |
|---|---|
| Propionic anhydride | 11.3 |
| Propionic acid | 87.0 |

EXAMPLE 9

This example is included to demonstrate that it is possible to recycle these novel catalyst systems.

A batch reactor is charged with the following ingredients: 0.312 g. (0.4 mmole) of IrCl(CO)(Ph$_3$P)$_2$ as the catalyst precursor; 1.056 g. (4.0 mmoles) of pentachlorophenol, C$_6$Cl$_5$OH, as the promoter component; 4 ml. of H$_2$O as a reactant; and 76 ml. of propionic acid as the solvent.

The reactor is pressured to 50 p.s.i.g. with carbon monoxide and then heated to 195° C. After reaching the desired reaction temperature, 195° C., the reactor is then pressured to 700 p.s.i.g. with a 50/50 mole percent CO/C$_2$H$_4$ blend. The reaction is carried out at constant pressure by feeding the gas blend from a high pressure reservoir into the reactor to maintain the reactor pressure. During the reaction time of 21 hours, about 2500 p.s.i.g. of feed gas is consumed.

The reaction mixture, upon analysis by a gas chromatography technique, yields a solution containing

| | Wt. percent |
|---|---|
| Propionic anhydride | 43.2 |
| Propionic acid | 53.1 |

The reaction product mixture is subsequently distilled under one atmosphere of carbon monoxide until only 20 ml. remained in the distillation pot. This residue is diluted with 60 ml. of propionic acid and the resulting solution recharged to the autoclave using the same heat-up procedure and conditions as described above. During the reaction time of 23 hours, ca. 1685 p.s.i.g. of feed gas is consumed.

This reaction mixture, upon analysis by gas chromatography yields a solution containing

| | Wt. percent |
|---|---|
| Propionic anhydride | 62.2 |
| Propionic acid | 35.5 |

After removal of the above propionic anhydride and propionic acid, the residual solution still contains the unreacted pentachlorophenol which retains its activity as a promoter for the iridium catalyst.

EXAMPLE 10

A batch reactor is charged with the following ingredients: 0.262 g. (0.4 mmole) of $IrCl(CO)(Ph_2MeP)_2$ as the catalyst precursor; 0.876 g. (4.0 mmoles) pentacyanophenol, $C_6(CN)_5OH$, as the promoter component; 4 ml. of $H_2O$ as a reactant; and 76 ml. of acetic acid as the solvent.

The reactor is pressured to 50 p.s.i.g. with ethylene and then heated to 195° C. After reaching the desired reaction temperature, 195° C., the reactor is then pressured to 700 p.s.i.g. with a 50/50 mole perecent $CO/C_2H_4$ blend. The reaction is carried out at constant pressure by feeding the gas blend from a high pressure reservoir into the reactor to maintain the reactor pressure. During the reaction time of 4.5 hours, 1010 p.s.i.g. of feed gas is consumed.

The reaction mixture, upon analysis by a gas chromatography technique, yields a solution containing

| | Wt. percent |
|---|---|
| Water | 0.4 |
| Acetic acid | 81.3 |
| Propionic acid | 18.3 |

EXAMPLE 11

A batch reactor is charged with the following ingredients: 0.264 g. (0.4 mmole) of $IrCl(CO)(Bu_3P)_2$ as the catalyst precursor; 0.720 g. (4.0 mmoles) pentamethylthiophenol, $C_6(CH_3)_5SH$, as the promoter component; 4 ml. of $H_2O$ as a reactant; and 76 ml. of acetic acid as the solvent.

The reactor is pressured to 50 p.s.i.g. with ethylene and then heated to 195° C. After reaching the desired reaction temperature, 195° C., the reactor is then pressured to 700 p.s.i.g. with a 50/50 mole percent $CO/C_2H_4$ blend. The reaction is carried out at constant pressure by feeding the gas blend from a high pressure reservoir into the reactor to maintain the reactor pressure. During the reaction time of 4.5 hours, 1010 p.s.i.g. of feed gas is consumed.

The reaction mixture, upon analysis by a gas chromatography technique, yields a solution containing

| | Wt. percent |
|---|---|
| Water | 0.4 |
| Acetic acid | 80.7 |
| Propionic acid | 19.7 |

In similar experiments using equivalent molar proportions of (a) nitrophenol and (b) the mono-butyl ether of catecol, similar promoting activity of the iridium catalyst composition occurs.

EXAMPLE 12

A batch reactor is charged with the following ingredients: 0.265 g. (0.4 mmole) of $IrCl(CO)(Bu_3P)_2$ as the catalyst precursor; 0.50 g. (4.0 mmoles) of monomethylthiophenol, $C_6H_4(CH_3)SH$, as the promoter component; 4 ml. of $H_2O$ as a reactant; and 76 ml. of acetic acid as the solvent.

The reactor is pressured to 50 p.s.i.g. with ethylene and then heated to 195° C. After reaching the desired reaction temperature, 195° C., the reactor is then pressured to 700 p.s.i.g. with a 50/50 mole percent ($CO/C_2H_4$ blend. The reaction is carried out at constant pressure by feeding the gas blend from a high pressure reservoir into the reactor to maintain the reactor pressure. During the reaction time of 3 hours, 1080 p.s.i.g. of feed gas is consumed. The reaction mixture, upon analysis by a gas chromatography technique, yields a solution containing

| | Wt. percent |
|---|---|
| Water | 0.3 |
| Acetic acid | 80.7 |
| Propionic acid | 19.7 |

EXAMPLE 13

A batch reactor is charged with the following ingredients: 0.312 g. (0.4 mmole) of $IrCl(CO)(Ph_3P)_2$ as the catalyst precursor; 0.2 ml. (0.8 mmole) of perfluoroacetic acid, $CF_3COOH$, as the promoter component; 4 ml. of $H_2O$ as a reactant; and 76 ml. of propionic acid as the solvent.

The reactor is pressured to 50 p.s.i.g. with carbon monoxide and then heated to 195° C. After reaching the desired reaction temperature, 195° C., the reactor is then pressured to 700 p.s.i.g. with a 50/50 mole perecent $CO/C_2H_4$ blend. The reaction is carried out at constant pressure by feeding the gas blend from a high pressure reservoir into the reactor to maintain the reactor pressure. During the reaction time of 5 hours, 1090 p.s.i.g. of feed gas is consumed.

The reaction mixture, upon analysis by a gas chromatography technique, yields a solution containing

| | Wt. percent |
|---|---|
| Propionic anhydride | 7.4 |
| Propionic acid | 90.0 |

EXAMPLE 14

A batch reactor is charged with the following ingredients: 0.312 g. (0.4 mmole) of $IrCl(CO)(Ph_3P)_2$ as the catalyst precursor; 0.848 g. (4.0 mmoles) of perfluorobenzoic acid, $C_6F_5COOH$, as the promoter component; and 80 ml. of propionic acid as the solvent.

The reactor is pressured to 50 p.s.i.g. with ethylene and then heated to 195° C. After reaching the desired reaction temperature, 195° C., the reactor is then pressured to 700 p.s.i.g. with a 50/50 mole percent $CO/C_2H_4$ blend. The reaction is carried out at constant pressure by feeding the gas blend from a high pressure reservoir into the reactor to maintain the reactor pressure. During the reaction time of 20 hours, 440 p.s.i.g. of feed gas is consumed.

The reaction mixture, upon analysis by a gas chromatography technique, yields a solution containing

| | Wt. percent |
|---|---|
| Propionic anhydride | 12.8 |
| Propionic acid | 86.1 |

EXAMPLE 15

A batch reactor is charged with the following ingredients: 0.312 g. (0.4 mmole) of $IrCl(CO)(Ph_3P)_2$ as the catalyst precursor; 0.304 g. (4.0 mmoles) of thioacetic acid, $CH_3COSH$, as the promoter component; 4 ml. of $H_2O$ as a reactant; and 76 ml. of acetic acid as the solvent.

The reactor is pressured to 50 p.s.i.g. with ethylene and then heated to 195° C. After reaching the desired reaction temperature, 195° C., the reactor is then pressured to 700 p.s.i.g. with a 50/50 mole percent $CO/C_2H_4$ blend. The reaction is carried out at constant pressure by feeding the gas blend from a high pressure reservoir into the reactor to maintain the reactor pressure. During the reaction time of 3 hours, 970 p.s.i.g. of feed gas is consumed.

The reaction mixture, upon analysis by a gas chromatography technique, yields a solution containing

| | Wt. percent |
|---|---|
| Water | 1.0 |
| Acetic acid | 81.2 |
| Propionic acid | 17.5 |

In another experiment, the use of a molar equivalent proportion of difluorothioacetic acid as the promoter gives

11 similar promoting action to the iridium catalyst composition.

EXAMPLE 16

A batch reactor is charged with the following ingredients: 0.312 g. (0.4 mmole) of $IrCl(CO)(Ph_3P)_2$ as the catalyst precursor; 1.00 g. (6.7 mmoles) of trifluoromethanesulfonic acid, $CF_3SO_3H$, as the promoter component; and 80 ml. of propionic acid as the solvent.

The reactor is pressured to 50 p.s.i.g. with carbon monoxide and then heated to 195° C. After reaching the desired reaction temperature, 195° C., the reactor is then pressured to 700 p.s.i.g. with a 50/50 mole percent CO/$C_2H_4$ blend. The reaction is carried out at constant pressure by feeding the gas blend from a high pressure reservoir into the reactor to maintain the reactor pressure. During the reaction time of 19 hrs., 2660 p.s.i.g. of feed gas is consumed.

The reaction mixture, upon analysis by a gas chromatography technique yields a solution containing

| | Wt. percent |
|---|---|
| Propionic anhydride | 25.6 |
| Propionic acid | 74.0 |

A subsequent experiment showed that the very strong acid, $CF_3SO_3H$, will not catalyze the ethylene carbonylation reaction by itself, under the above conditions.

EXAMPLE 17

A batch reactor is charged with the following ingredients: 0.312 g. (0.4 mmole) of $IrCl(CO)(Ph_3P)_2$ as the catalyst precursor; 0.760 g. (4.0 mmoles) of p-toluenesulfonic acid, $p-CH_3C_6H_4SO_3H$, as the promoter component; 4 ml. of $H_2O$ as a reactant; and 76 ml. of acetic acid as the solvent.

The reactor is pressured to 50 p.s.i.g. with carbon monoxide and then heated to 195° C. After reaching the desired reaction temperature, 195° C., the reactor is then pressured to 700 p.s.i.g. with a 50/50 mole percent CO/$C_2H_4$ blend. The reaction is carried out at constant pressure by feeding the gas blend from a high pressure reservoir into the reactor to maintain the reactor pressure. During the reaction time of 17.5 hours, 250 p.s.i.g. of feed gas is consumed.

The reaction mixture, upon analysis by a gas chromatography technique, yields a solution containing

| | Wt. percent |
|---|---|
| Water | 3.5 |
| Acetic acid | 90.5 |
| Propionic acid | 5.1 |

EXAMPLE 18

A batch reactor is charged with the following ingredients: 0.312 g. (0.4 mmole) of $IrCl(CO)(Ph_3P)_2$ as the catalyst precursor; 1.00 g. (5.0 mmoles) of pentafluorothiophenol, $C_6F_5SH$, as the promoter component; 4 ml. of $H_2O$ as a reactant; and 32 ml. of propionic acid as the solvent.

The reactor is pressured to 50 p.s.i.g. with carbon monoxide and then heated to 195° C. After reaching the desired reaction temperature, 195° C., 44 ml. (0.2 mole) of α-dodecene is then pressured into the reactor from a charge pot. The reactor pressure is then increased to 700 p.s.i.g. with pure carbon monoxide.

The reaction is carried out at constant pressure by feeding carbon monoxide from a high pressure reservoir into the reactor to maintain the reactor pressure. During the reaction time of 5 hours, 220 p.s.i.g. of feed gas is consumed.

The reaction mixture, upon analysis by a gas chromatography technique, yields a solution containing

| | Wt. percent |
|---|---|
| Water | 1.7 |
| Dodecene | 33.5 |
| Tridecanoic acid | 16.7 |
| Propionic acid | 48.1 |

12

The ratio of normal to branched tridecanoic acids is found to be 2.7:1.

EXAMPLE 19

A batch reactor is charged with the following ingredients: 0.262 g. (0.4 mmole) of $IrCl(CO)(PH_2MeP)_2$ as the catalyst precursor; 1.42 g. (5.0 mmoles) of pentachlorothiophenol, $C_6Cl_5SH$, is the promoter component; 4 ml. of $H_2O$ as a reactant; and 32 ml. of propionic acid as a solvent.

The reactor is pressured to 50 p.s.i.g. with carbon monoxide and then heated to 195° C. After reaching the desired reaction temperature, 195° C., 44 ml. (0.2 mole) of α-dodecene is then pressure into the reactor from a charge pot. The reactor pressure is then increased to 700 p.s.i.g. with pure carbon monoxide. The reaction is carried out at constant pressure by feeding carbon monoxide from a high pressure reservoir into the reactor to maintain the reactor pressure. During the reaction time of 8 hours, 310 p.s.i.g. of feed gas is consumed.

The reaction mixture, upon analysis by a gas chromatography technique, yields a solution containing

| | Wt. percent |
|---|---|
| Water | 1.0 |
| Dodecene | 28.3 |
| Tridecanoic acid | 20.0 |
| Propionic acid | 47.6 |

EXAMPLE 20

A batch reactor is charged with the following ingredients: 0.276 g. (0.4 mmole) of $RhCl(CO)(Ph_3P)_2$ as the catalyst precursor; 1.00 g. (5.0 mmoles) of pentafluorothiophenol, $C_6F_5SH$, as the promoter component; 4 ml. of $H_2O$ as a reactant; and 51 ml. of propionic acid as the solvent.

The reactor is pressured to 50 p.s.i.g. with carbon monoxide and then heated to 195° C. After reaching the desired reaction temperature, 195° C., 25 ml. (0.2 mole) of hexene-1 is pressured into the reactor from a charge pot. The reactor pressure is then increased to 700 p.s.i.g. with pure carbon monoxide. The reaction is carried out at constant pressure by feeding carbon monoxide from a high pressure reservoir into the reactor to maintain the reactor pressure. During the reaction time of 5 hours, 250 p.s.i.g. of feed gas is consumed.

The reaction mixture, upon analysis by a gas chromatography technique, yields a solution containing

| | Wt. percent |
|---|---|
| Water | 2.4 |
| Hexene | 12.3 |
| Hexanoic acid | 16.9 |
| Propionic acid | 50.3 |

The ratio of normal to branched heptanoic acids is found to be 2.4:1.

EXAMPLE 21

This example is included to show the corrosive nature of the halide promoted catalyst systems and the separation problems which are encountered during recycle of these promoters.

A batch reactor is charged with the following ingredients: 0.312 g. (0.4 mmole) of $IrCl(CO)(Ph_3P)_2$ as the catalyst precursor; 0.90 g. of 57% HI solution (4.0 mmoles HI) as the promoter component; 4 ml. of $H_2O$ as a reactant; and 76 ml. of propionic acid as the solvent.

The reactor is pressured to 50 p.s.i.g. with carbon monoxide and then heated to 195° C. After reaching the desired reaction temperature, 195° C., the reactor is then pressured to 700 p.s.i.g. with a 50/50 mole percent CO/$C_2H_4$ blend. The reaction is carried out at constant pressure by feeding the gas blend from a high pressure reservoir into the reactor to maintain the reactor pressure. During the reaction time of 60 minutes, 1050 p.s.i.g. of feed gas is consumed.

Examination of the Type 316 stainless steel reactor and its internal parts reveals substantial corrosion, much greater than when C₆F₅SH is used as the promoter under the same conditions (see Example 1).

Distillation of the product solution from this reaction results in substantial carry-over of the iodide promoter in the form of ethyl iodide, hydrogen iodide, and free iodine. Not only does this result in impure products but it also requires that additional iodide promoter be added to the pot residue before complete activity of the catalyst can be restored. By choosing a promoter of the present group of appropriate boiling point, e.g. C₆Cl₅OH, the separation problem of the promoter can be eliminated.

EXAMPLE 22

This example is included to show the corrosive nature chloro-substituted aliphatic carboxylic acids when used as promoters for olefin carboxylation reactors.

A batch reactor is charged with the following ingredients: 0.312 g. (0.4 mmole) of IrCl(CO)(Ph₃P)₂ as the catalyst precursor; 0.378 g. (4.0 mmoles) of chloroacetic acid, ClCH₂COOH, as the promoter component; 4 ml. of H₂O as a reactant; and 76 ml. of propionic acid as the solvent.

The reactor is pressured to 50 p.s.i.g. with carbon monoxide and then heated to 195° C. After reaching the desired reaction temperature, 195° C., the reactor is then pressured to 700 p.s.i.g. with a 50/50 mole percent CO/C₂H₄ blend. The reaction is carried out at constant pressure by feeding the gas blend from a high pressure reservoir into the reactor to maintain the reactor pressure. During the reaction time of 90 minutes, 1000 p.s.i.g. of feed gas is consumed.

An examination of the Type 316 stainless steel reactor and its internal parts reveals substantial corrosion, much greater than when C₆F₅SH was used as the promoter under the same conditions (see Example 1).

What is claimed is:

1. In a process for production of carboxylic acids, carboxylic acid anhydrides, and mixtures thereof, wherein an ethylenically unsaturated hydrocarbon having 2 to 30 carbon atoms is reacted with carbon monoxide and at least one member of the group consisting of water, carboxylic acids having from 2 to 30 carbon atoms, and mixtures thereof, at a temperature of 50° C. to 300° C., the improvement which comprises contacting the said reactants in the presence of a catalyst system essentially comprised of a Group VIII metal compound, a promoter selected from the group consisting of
    (a) phenol, substituted phenols, and substituted thiophenols, in which the substituents on the substituted compounds are alkyl substituents of from 1 to 30 carbon atoms; alkoxy substituents of from 1 to 20 carbon atoms; nitro substituents; nitrile substituents; and halogen substituents selected from the group consisting of fluorine, chlorine, bromine, and iodine; and
    (b) fluorine substituted thiocarboxylic acids of 1 to 30 carbon atoms.

2. Process as in claim 1 in which the Group VIII metal is cobalt, rhodium or iridium.

3. Process as in claim 1 in which the partial pressure of carbon monoxide is from 1 p.s.i.a. to 15,000 p.s.i.a.

4. A process as in claim 1 in which the ethylenically unsaturated hydrocarbon is ethylene and the product is propionic acid.

5. A process as in claim 1 in which the ethylenically unsaturated hydrocarbon is comprised of olefin having from 3 to 8 carbon atoms and the product is comprised of carboxylic acids having from 4 to 9 carbon atoms.

6. A process as in claim 1 in which the ethylenically unsaturated hydrocarbon is comprised of olefins having from 9 to 19 carbon atoms and the product is comprised of carboxylic acids having from 10 to 20 carbon atoms.

7. In a process for production of carboxylic acids, carboxylic acid anhydrides, and mixtures thereof, wherein an ethylenically unsaturated hydrocarbon having 2 to 30 carbon atoms is reacted with carbon monoxide and at least one member of the group consisting of water, carboxylic acids having from 2 to 30 carbon atoms, and mixtures thereof, at a temperature of 50° C. to 300° C., the improvement which comprises contacting the said reactants in the presence of a catalyst system essentially comprised of iridium bistriphenylphosphine carbonyl acetate and a promoter selected from the group consisting of
    (a) phenol, substituted phenols, and substituted thiophenols, in which the substituents on the substituted compounds are alkyl substituents of from 1 to 30 carbon atoms; alkoxy substituents of from 1 to 20 carbon atoms; nitro substituents; and halogen substituents selected from the group consisting of fluorine, chlorine, bromine, and iodine; and
    (b) fluorine substituted thiocarboxylic acids of 1 to 30 carbon atoms.

8. In a process for production of carboxylic acids, carboxylic acid anhydrides, and mixtures thereof, wherein an ethylenically unsaturated hydrocarbon having 2 to 30 carbon atoms is reacted with carbon monoxide and at least one member of the group consisting of water, carboxylic acids having from 2 to 30 carbon atoms, and mixtures thereof, at a temperature of 50° C. to 300° C., the improvement which comprises contacting the said reactants in the presence of a catalyst system essentially comprised of rhodium acetate and a promoter selected from the group consisting of
    (a) phenol, substituted phenols, and substituted thiophenols, in which the substituents on the substituted compounds are alkyl substituents of from 1 to 30 carbon atoms; alkoxy substituents of from 1 to 20 carbon atoms; nitro substituents; nitrile substituents; and halogen substituents selected from the group consisting of fluorine, chlorine, bromine, and iodine; and
    (b) fluorine substituted thiocarboxylic acids of 1 to 30 carbon atoms.

9. In a process for production of carboxylic acids, carboxylic acid anhydrides, and mixtures thereof, wherein an ethylenically unsaturated hydrocarbon having 2 to 30 carbon atoms is reacted with carbon monoxide and at least one member of the group consisting of water, carboxylic acids having from 2 to 30 carbon atoms, and mixtures thereof, at a temperature of 50° C. to 300° C., the improvement which comprises contacting the said reactants in the presence of a catalyst system essentially comprised of a Group VIII metal compound and pentachlorophenol as a promoter.

10. In a process for production of carboxylic acids, carboxylic acid anhydrides, and mixtures thereof, wherein an ethylenically unsaturated hydrocarbon having 2 to 30 carbon atoms is reacted with carbon monoxide and at least one member of the group consisting of water, carboxylic acids having from 2 to 30 carbon atoms, and mixtures thereof, at a temperature of 50° C. to 300° C., the improvement which comprises contacting the said reactants in the presence of a catalyst system essentially comprised of a Group VIII metal compound and pentafluorophenol as a promoter.

11. In a process for production of carboxylic acids, carboxylic acid anhydrides, and mixtures thereof, wherein an ethylenically unsaturated hydrocarbon having 2 to 30 carbon atoms is reacted with carbon monoxide and at least one member of the group consisting of water, carboxylic acids having from 2 to 30 carbon atoms, and mixtures thereof, at a temperature of 50° C. to 300° C., the improvement which comprises contacting the said reactants in the presence of a catalyst system essentially comprised of a Group VIII metal compound and pentafluorothiophenol as a promoter.

12. In a process for production of carboxylic acids, carboxylic acid anhydrides, and mixtures thereof, wherein an ethylenically unsaturated hydrocarbon having 2 to 30 carbon atoms is reacted with carbon monoxide and at least one member of the group consisting of water, carboxylic acids having from 2 to 30 carbon atoms, and mixtures thereof, at a temperature of 50° C. to 300° C., the improvement which comprises contacting the said reactants in the presence of a catalyst system essentially comprised of a Group VIII metal compound and pentachlorothiophenol as a promoter.

13. In a process for production of carboxylic acids, carboxylic acid anhydrides, and mixtures thereof, wherein an ethylenically unsaturated hydrocarbon having 2 to 30 carbon atoms is reacted with carbon monoxide and at least one member of the group consisting of water, carboxylic acids having from 2 to 30 carbon atoms, and mixtures thereof, at a temperature of 50° C. to 300° C., the improvement which comprises contacting the said reactants in the presence of a catalyst system essentially comprised of a Group VIII metal compound and trifluorothioacetic acid as a promoter.

References Cited

UNITED STATES PATENTS

| | | | |
|---|---|---|---|
| 2,593,440 | 4/1952 | Hagemeyer, Jr. | 260—533 A |
| 3,665,034 | 5/1972 | Komatsu et al. | 260—533 A |
| 3,282,973 | 11/1966 | Devine et al. | 260—413 |
| 3,268,579 | 8/1966 | Smolin | 260—533 A |
| 3,505,394 | 4/1970 | Oliver | 260—413 X |

FOREIGN PATENTS

| | | | |
|---|---|---|---|
| 252,386 | 3/1963 | Australia | 260—533 A |

E. G. LOVE, Assistant Examiner

U.S. Cl. X.R.

260—514 C, 515 R, 533 A, 534 R, 535 R, 546

PO-1050
(5/69)

UNITED STATES PATENT OFFICE
CERTIFICATE OF CORRECTION

Patent No. 3,816,490                    Dated  June 11, 1974

Inventor(s)  Denis Forster, Donald E. Morris

It is certified that error appears in the above-identified patent and that said Letters Patent are hereby corrected as shown below:

Column 1, line 56, "presence", should read --absence--,

Column 4, line 50, "catalystic", should read -- catalytic --.

Column 5, line 51, "0.5", should read --5.0--,

Column 6, after line 8 following sentence left out

--A batch reactor is charged with the following ingredients:--.

Signed and sealed this 15th day of October 1974.

(SEAL)
Attest:

McCOY M. GIBSON JR.                     C. MARSHALL DANN
Attesting Officer                       Commissioner of Patents